US009303727B2

(12) United States Patent
Reimann et al.

(10) Patent No.: US 9,303,727 B2
(45) Date of Patent: Apr. 5, 2016

(54) PLANETARY TRANSMISSION

(71) Applicant: Robert Bosch GmbH, Stuttgart (DE)

(72) Inventors: Mario Reimann, Wetter (DE); Markus Magiera, Gevelsberg (DE); Stefan Hesterberg, Wetter (DE); Christian Kapschick, Dortmund (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/028,822

(22) Filed: Sep. 17, 2013

(65) Prior Publication Data

US 2014/0087913 A1    Mar. 27, 2014

(30) Foreign Application Priority Data

Sep. 21, 2012  (DE) .......................... 10 2012 018 714

(51) Int. Cl.
*F16H 1/28*       (2006.01)
*B60K 17/04*    (2006.01)
*F16H 57/08*    (2006.01)
*F16H 1/46*       (2006.01)
*B60K 7/00*      (2006.01)

(52) U.S. Cl.
CPC .............. *F16H 1/28* (2013.01); *B60K 17/046* (2013.01); *F16H 1/46* (2013.01); *F16H 57/082* (2013.01); *B60K 7/00* (2013.01); *B60K 2007/0038* (2013.01); *B60K 2007/0092* (2013.01)

(58) Field of Classification Search
None
See application file for complete search history.

(56) References Cited

U.S. PATENT DOCUMENTS

| 1,590,528 | A | * | 6/1926 | Lansing ...................... 475/341 |
| 1,768,225 | A | * | 6/1930 | Whitney ...................... 475/337 |
| 2,681,245 | A | * | 6/1954 | Ackermans ............. 292/341.19 |
| 6,749,533 | B2 | * | 6/2004 | Norman ...................... 475/337 |
| 7,156,769 | B2 | * | 1/2007 | Kingston et al. ............. 475/331 |
| 2007/0049450 | A1 | * | 3/2007 | Miller .......................... 475/208 |
| 2010/0206388 | A1 | * | 8/2010 | Bielab ............................ 137/12 |

FOREIGN PATENT DOCUMENTS

DE    60 2005 005 448 T2    4/2009

OTHER PUBLICATIONS

ISO Standard Grooved Pins. Fastener Catalog [online]. Maryland Metrics, 2003 [retrieved on Jun. 26, 2015]. Retrieved from the Internet: <URL:www.mdmetric.com/fastindx/uj32_36.pdf>.*

* cited by examiner

*Primary Examiner* — Ramya Burgess
*Assistant Examiner* — David Morris
(74) *Attorney, Agent, or Firm* — Maginot, Moore & Beck LLP

(57) ABSTRACT

A planetary transmission includes an annulus on which a cover is arranged and a planet spider having a planet spider journal facing the cover. The planetary transmission further includes an intermediate element connected to the planet spider journal or to a sun wheel shaft such that the intermediate element is arranged at least partially between the planet spider journal or the sun wheel shaft and the cover. One or more of the planet spider journal and the sun wheel shaft are configured to be moved relative to the cover.

8 Claims, 4 Drawing Sheets

PLANETARY TRANSMISSION

This application claims priority under 35 U.S.C. §119 to patent application no. DE 10 2012 018 714.9, filed on Sep. 21, 2012 in Germany, the disclosure of which is incorporated herein by reference in its entirety.

BACKGROUND

The present disclosure relates to a planetary transmission and, in particular, to a planetary transmission in which there is a reduction in friction at an axial abutment of the planet spider thereof and/or of the sun wheel shaft thereof on the cover of the transmission.

Planetary transmissions are known from DE 60 2005 005 448 T2, for example. Here, a sun wheel on a sun wheel shaft and a planet spider having planet wheels are arranged in an annulus.

Planetary transmissions are used as travel transmissions for frequent and infrequent travelers, for example. In such planetary transmissions, there is either abutment of the sun wheel with respect to the sun wheel shaft, and/or of the sun wheel shaft with respect to the cover, which is arranged on the annulus, and/or of a planet spider with respect to the cover.

In this case, there is axial guidance of the planet spider and/or of the sun wheel shaft. One particularly desirable characteristic here is reduction in friction at the axial abutment of the planet spider and/or of the sun wheel shaft on the cover of the planetary transmission. As a solution for this, consideration has been given to providing the sun wheel shaft with a cylindrical roller or sleeve. Moreover, a friction-reducing element in the cover of the transmission has been considered. As another solution, the end face of the planet spider journal has been made convex.

However, the disadvantage with such solutions is that, in general, either the planet spider journal or the mating running surface in the cover has to be hardened, e.g. nitrided. Such nitriding is very involved in terms of production technology and is very expensive, especially in the case of forged blanks, as represented by the planet wheel journal, sun wheel shaft etc.

Another disadvantage is that there is no freedom in the combination of materials in the friction partners, namely the sun wheel/sun wheel shaft or planet spider journal/cover or sun wheel shaft/cover. As a result, there may be high wear, depending on the friction partners.

SUMMARY

It is therefore the object of the present disclosure to provide a planetary transmission by means of which the abovementioned problems can be solved. In particular, the intention is to provide a planetary transmission in which the production cycle times for the planetary transmission are short and there is high flexibility in respect of the manufacture thereof so as to both save costs and also allow simple adaptation to customer-specific requirements.

This object is achieved by a planetary transmission having the features of the disclosure.

Advantageous further embodiments of the planetary transmission are indicated in the dependent patent claims.

Further possible implementations of the disclosure also comprise combinations, not explicitly mentioned, of features or embodiments described above or below in connection with the illustrative embodiments. At the same time, a person skilled in the art will also add individual aspects as improvements or supplementary measures to the respective basic form of the disclosure.

BRIEF DESCRIPTION OF THE DRAWINGS

The disclosure is described in greater detail below with reference to the attached drawings and by means of illustrative embodiments. In the drawings.

In the figures, elements which are identical or functionally identical are provided with the same reference signs, unless indicated otherwise.

DETAILED DESCRIPTION

Figure 1:
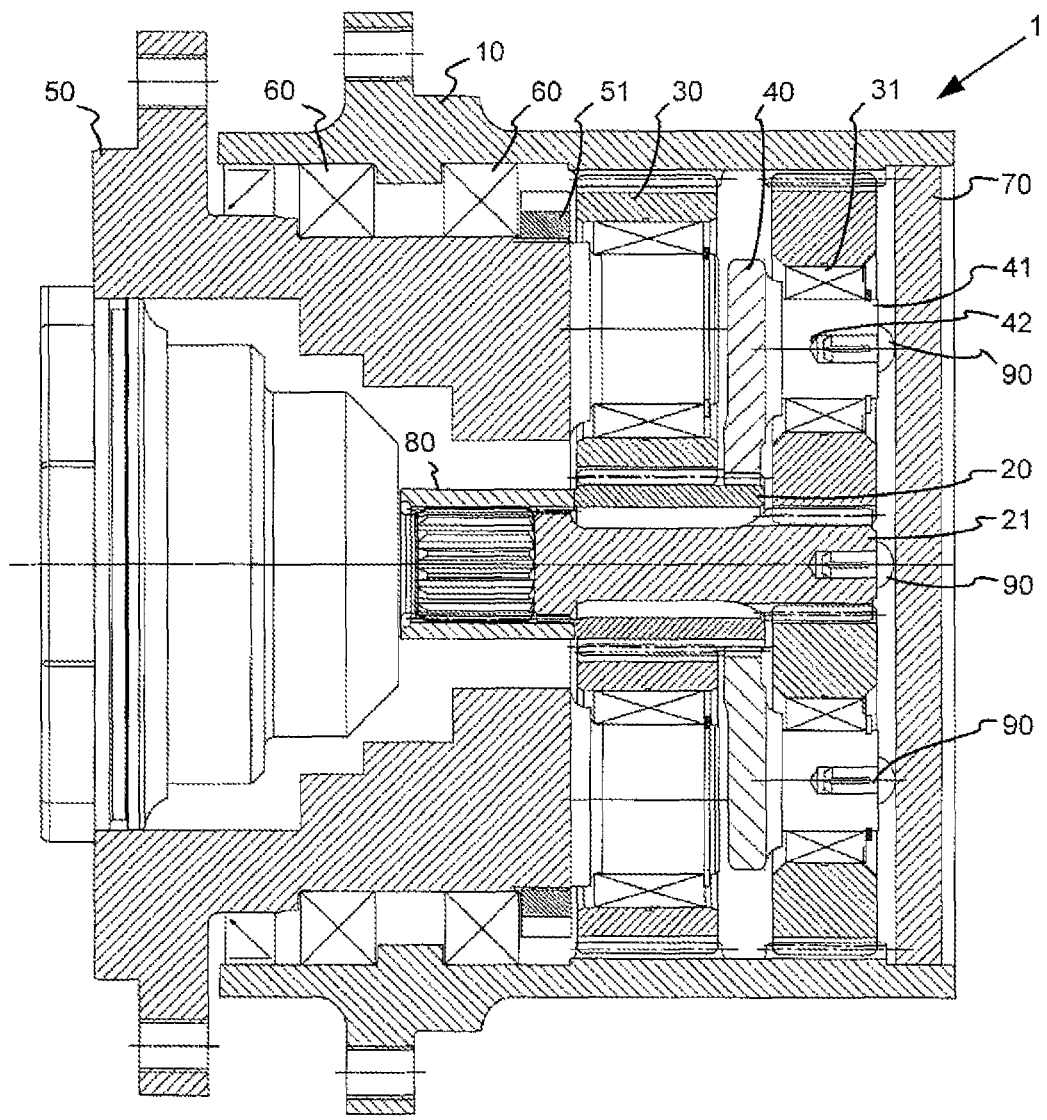
FIG. 1 shows a sectional view of a planetary transmission in accordance with a first illustrative embodiment.

FIG. 1 shows a planetary transmission 1 having an annulus 10, a sun wheel 20, a sun wheel shaft 21, an opening 22, which is arranged axially in the sun wheel shaft 21, a planet wheel 30, a planet bearing 31, a planet carrier or planet spider 40, a plurality of planet spider journals 41, an opening 42, which is arranged axially in the planet spider journal 41, a supporting axle 50, a shaft nut 51, a main bearing assembly 60, a cover 70, a driver 80, and a plurality of intermediate elements 90. The sun wheel shaft 21 and/or the planet spider 40 with the planet spider journal 41 can be moved relative to the cover 70 in an axial direction. Moreover, the sun wheel 20 and the sun wheel shaft 21 can be moved relative to one another.

At least one of the intermediate elements 90 in FIG. 1 is embodied as a friction-reducing element. The intermediate element 90 is arranged at least partially between the cover 70 and one of the planet spider journals 41. Moreover, a further intermediate element 90 is arranged at least partially between the sun wheel shaft 21 and the cover 70. As a result, there is the possibility of abutment for the sun wheel 20 relative to the sun wheel shaft 21, and it is fixed axially. Moreover, there is the possibility of abutment for the sun wheel shaft 21 relative to the cover 70, and the sun wheel shaft 21 is fixed axially. In addition, there is the possibility of abutment for the planet spider 40 and hence for the planet spider journal 41 relative to the cover 70, and the planet spider 40 and hence the planet spider journal 41 are fixed axially.

Abutment of a preliminary stage of the planetary transmission 1 against the cover 70 is thereby ensured via the planet spider journal 41 and/or the sun wheel shaft 21. In the illustrative embodiment shown in FIG. 1, the abutment is achieved through the intermediate element 90 connected positively and/or non-positively to the planet spider journal 41. By means of the illustrative embodiment shown in FIG. 1, in which the intermediate element 90 is of offset design, the assembly of the planetary transmission 1 is simplified and, furthermore, the required clearance between the intermediate element 90 and the cover 70 is ensured. Moreover, the intermediate element 90 provides for absorption of the axial force between the planet spider 40 and the cover 70.

As a result, the possibility of increased friction is eliminated, even in the case of a possible high speed of revolution of the planet spider 40 relative to the cover 70. This is achieved by virtue of the fact that the friction partners, namely the intermediate element 90 and the cover 70, are matched to one another in an ideal way. In this case, no hardening process, e.g. nitriding etc., for one of the friction partners is necessary. However, it is also possible for the intermediate element 90 to be hardened, e.g. nitrided etc., this being significantly less expensive than hardening the forged sun wheel shaft 21 and/or the forged planet spider journal 41. In particular, a surface of the intermediate element 90 facing the cover 70 is at least partially hardened, e.g. nitrided etc.

Figure 2:
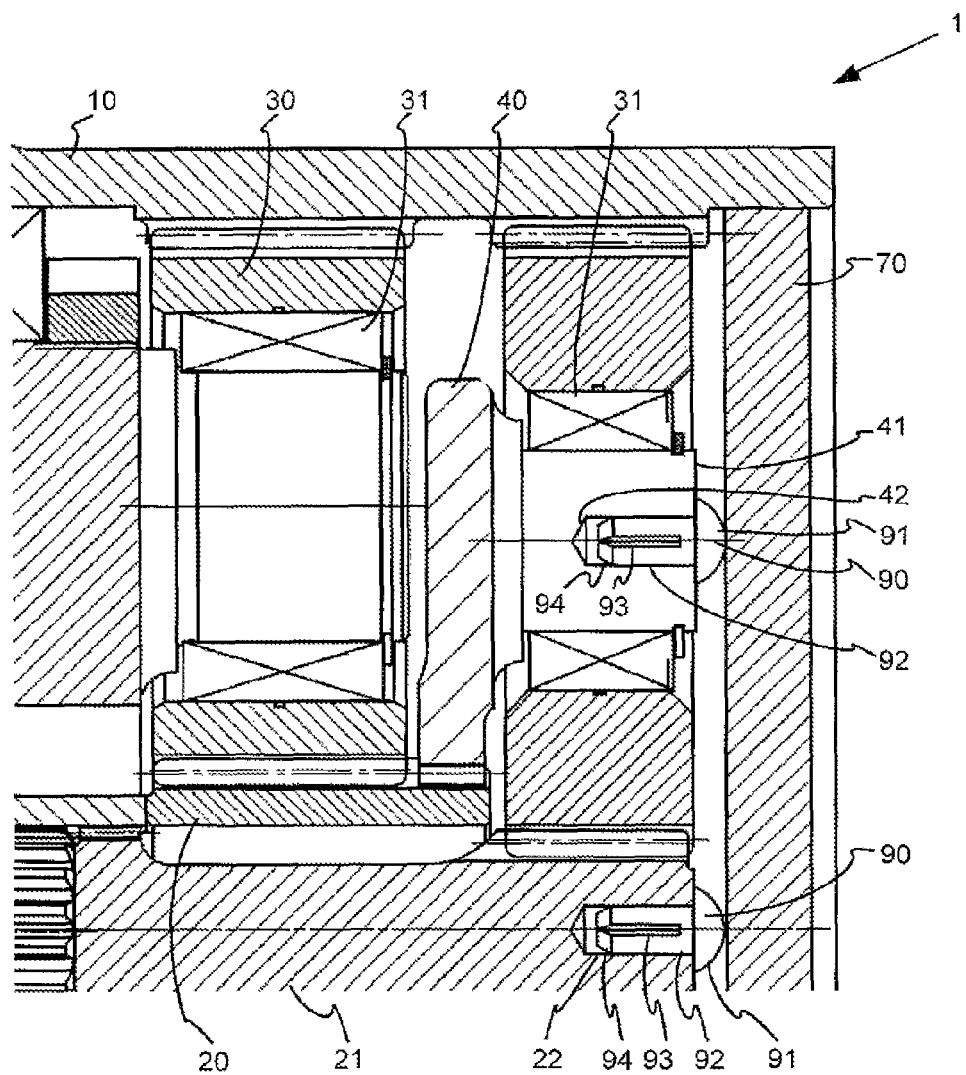
FIG. 2 shows a detail of the sectional view of a planetary transmission in accordance with a first illustrative embodiment.

FIG. 2 shows a detail view of the intermediate element 90 in the opening 42 in the planet spider journal 41 and in the opening 22 in the sun wheel shaft 21. As can clearly be seen here, the intermediate element 90 in this illustrative embodiment is embodied as a grooved pin, which has a mushroom head 91 and a mushroom stem 92. The mushroom head 91 projects from the planet spider journal 41 and from the sun wheel shaft 21 in the direction of the cover 70. The mushroom head 91 is thus arranged between the planet spider journal 41 and the cover 70 between the sun wheel shaft 21 and the cover 70.

In FIG. 2, the mushroom-shaped intermediate element 90 has a notch 93 and a chamfered end 94 in the mushroom stem 92, said notch being arranged, in particular, symmetrically with respect to the axis of the intermediate element 90. By virtue of the chamfered end 94 and the notch 93, the intermediate element 90 can be inserted easily into the opening 22 in the sun wheel shaft 21 or into the opening 42 in the planet spider journal 41. Moreover, the special embodiment described of the intermediate element 90 makes possible a non-positive and/or positive connection, relative to opening 22 or opening 42, between the intermediate element 90 and the sun wheel shaft 21 or the respective planet spider journal 41.

As a result, there is no longer any need for modifications to the planet spider 40 and/or to the planet spider journal 41 thereof and/or to the sun wheel shaft 21 after the forging thereof. This leads to a major cost saving. Moreover, the use of an intermediate element 90 embodied as a grooved pin makes it possible to reduce variance in the planet spider 40 or the planet spider journal 41 in the context of a modular principle. As a result, there are synergies with the principles of a module, such as production unbundling, variance reduction, this including the production tools, lower costs for logistics, consolidation of suppliers, use of standardized parts etc.

With the planetary transmission 1 described, high flexibility is possible in respect of different planetary transmissions, as are short production cycle times and simple adaptation to customer-specific requirements. As a result, short development times for different variants of the planetary transmission are also obtained. This too leads once again to cost savings.

Figure 3:
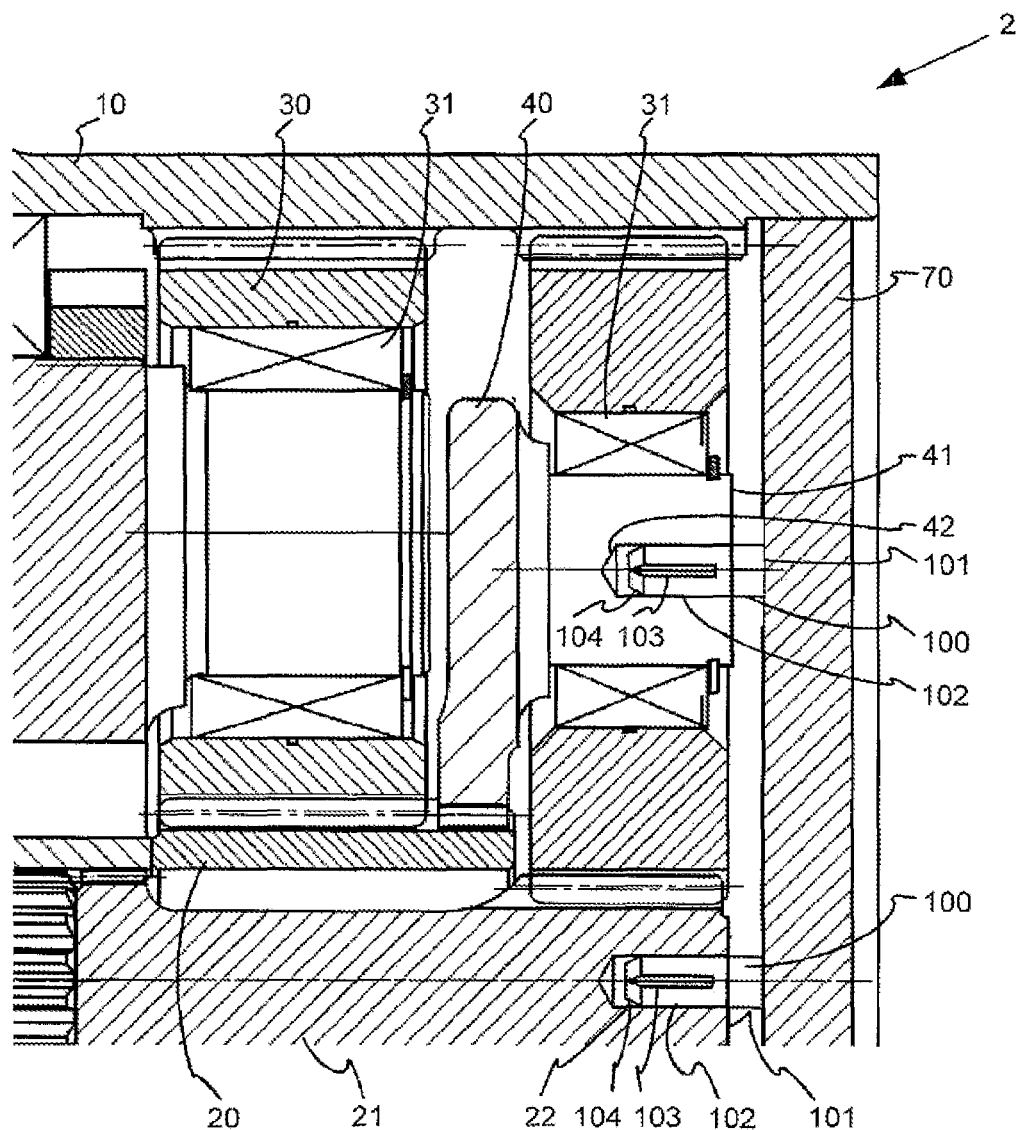
FIG. 3 shows a detail of a sectional view of a planetary transmission in accordance with a second illustrative embodiment.

FIG. 3 shows another embodiment of the intermediate element 100 in a planetary transmission 2 in accordance with a second illustrative embodiment. In this illustrative embodiment, intermediate element 90 is replaced by an intermediate element 100 having a head 101 and a stem 102. Moreover, the intermediate element 100 has a groove 103 in the stem 102 and a chamfered end 104. In this illustrative embodiment, the head 101 is shaped in such a way that it has substantially the same diameter as the stem 102. However, the head 101 projects from the planet spider journal 41 and from the sun wheel shaft 21 in the direction of the cover 70. Thus, the head 101 of an intermediate element 100 is arranged between the planet spider journal 41 and the cover 70 or between the sun wheel shaft 21 and the cover 70.

By this means too, it is possible to obtain a planetary transmission 2 which has the same advantages as those which were mentioned above in relation to the planetary transmission 1 of the first illustrative embodiment.

In other respects, the planetary transmission 2 in accordance with this illustrative embodiment is embodied in the same way as that described in connection with the first illustrative embodiment.

Figure 4:
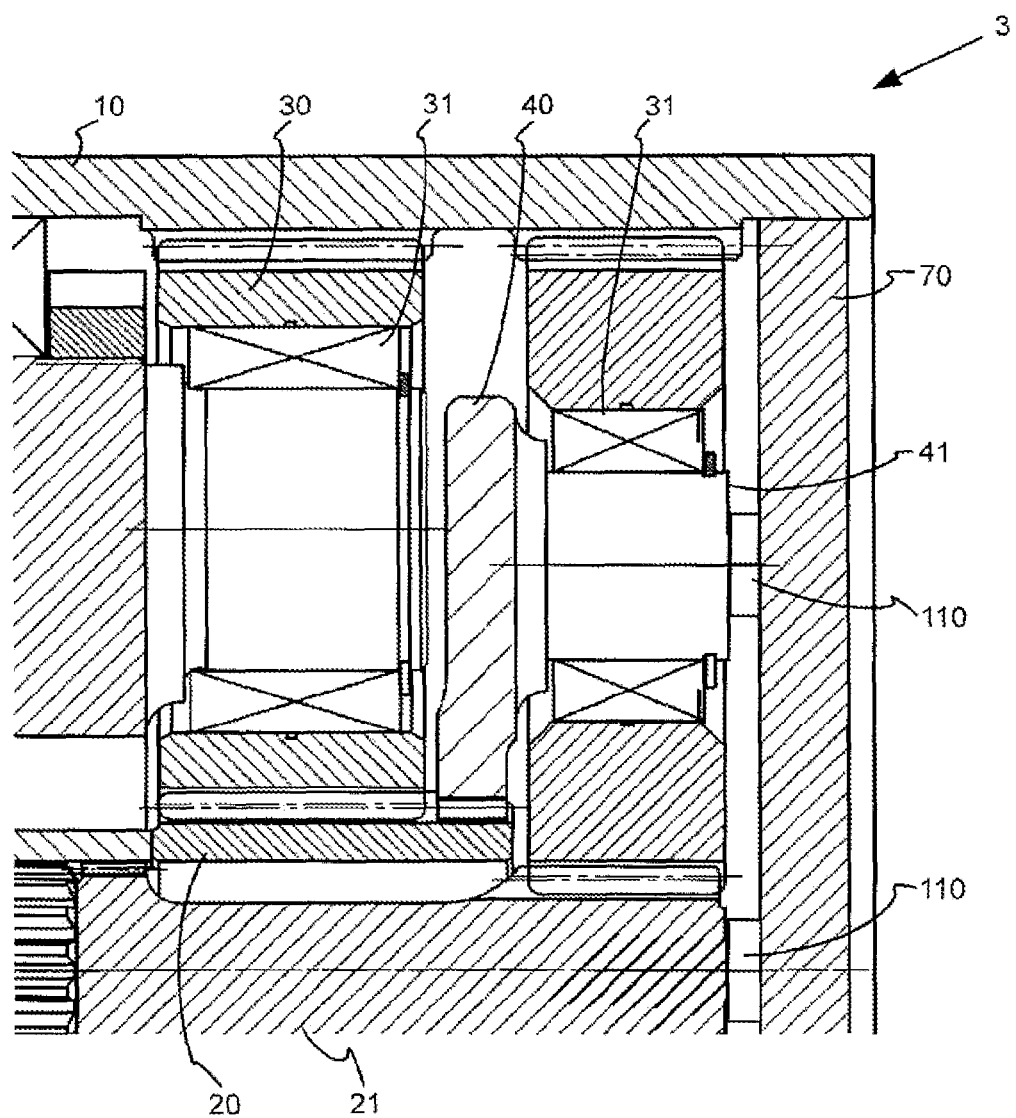
FIG. 4 shows a detail of a sectional view of a planetary transmission in accordance with a third illustrative embodiment.

FIG. 4 shows a planetary transmission 3 in accordance with a third illustrative embodiment. In this illustrative embodiment, the intermediate element 90 or 100 in accordance with the preceding illustrative embodiments is replaced by an intermediate element 110 between the planet spider journal 41 and the cover 70 and between the sun wheel shaft 21 and the cover 70. The intermediate element 110 is connected materially to the planet spider journal 41 and/or the sun wheel shaft 21. For this purpose, the intermediate element 110 is arranged on the planet spider journal 41 and/or the sun wheel shaft 21 in such a way, for example, that it projects from the planet spider journal 41 and/or the sun wheel shaft 21 in the direction of the cover 70.

In other respects, the planetary transmission 3 in accordance with this illustrative embodiment is embodied in the same way as that described in connection with the planetary transmission 1 in accordance with the first illustrative embodiment, even if no opening 42 (FIG. 2) is required in the planet spider journal 41 and no opening 22 (FIG. 2) is required in the sun wheel shaft 21 in the third illustrative embodiment.

Thus, the planetary transmission 3 in accordance with this illustrative embodiment also achieves the same advantages as described above in relation to the first illustrative embodiment.

All the above-described embodiments of the planetary transmission 1, 2, 3 in accordance with the first to third illustrative embodiments can be used individually or in all possible combinations. In particular, all the features and/or functions of the illustrative embodiments described above can be combined in any way. In addition, the following modifications, in particular, are conceivable.

The parts illustrated in the figures are shown schematically and may differ from the forms shown in the figures in the precise way in which they are embodied as long as their functions described above are ensured.

In addition to the illustrative embodiments described above, the intermediate element 90, 100, 110 can also be embodied exclusively as a positive intermediate element which is fitted or fits accurately into an opening 42 in the planet spider journal 41 or an opening 22 in the sun wheel shaft 21.

In addition to the embodiments of the intermediate element 90, 100, 110 which have been shown and described, a large number of other embodiments of the intermediate element 90, 100, 110 is possible, even if these embodiments and the large number of variants thereof are not explicitly mentioned here.

The intermediate element 90, 100 in accordance with the first and second illustrative embodiments can also be designed in such a way that there is only positive or only non-positive connection to the planet spider journal 41 or the sun wheel shaft 21.

The planetary transmission 1, 2, 3 can be a travel transmission for frequent and infrequent traveler applications. Moreover, the planetary transmission 1, 2, 3 in accordance with the first to third illustrative embodiments can be any desired derivative special form of transmission in which, if appropriate, emergency deactivation by means of a removable sun wheel shaft 21 is possible. In the case of an emergency deactivation in this sense, the flow of power is interrupted by disengaging toothing of the sun wheel shaft 21.

By means of the planetary transmission 1, 2, 3 in accordance with the first to third illustrative embodiments, a required axial clearance can be ensured. Moreover, a reduction in friction through selection of suitable combinations of materials at the tribological contact between the friction partners, namely the intermediate element 90, 100, 110 and the cover 70, is possible.

What is claimed is:

1. A planetary transmission, comprising:
    an annulus on which a cover is arranged;
    a planet spider having a planet spider journal facing the cover; and
    an intermediate element connected to a sun wheel shaft such that the intermediate element is arranged at least partially between the cover and the sun wheel shaft,
    wherein at least one of the planet spider journal and the sun wheel shaft are configured to be moved axially relative to the cover to a position in which the intermediate element abuts the cover.

2. The planetary transmission according to claim 1, wherein the intermediate element is connected positively to the sun wheel shaft.

3. The planetary transmission according to claim 1, wherein the intermediate element is connected non-positively to the sun wheel shaft.

4. The planetary transmission according to claim 1, wherein the intermediate element is connected materially to the sun wheel shaft.

5. The planetary transmission according to claim 1, wherein the intermediate element projects from the sun wheel shaft in the direction of the cover.

6. The planetary transmission according to claim 1, wherein the intermediate element is a grooved pin configured to engage partially in an opening in the sun wheel shaft.

7. A planetary transmission, comprising:
    an annulus on which a cover is arranged;
    a planet spider having a planet spider journal facing the cover; and
    an intermediate element connected to at least one of the planet spider journal and a sun wheel shaft such that the intermediate element is arranged at least partially between the cover and at least one of the planet spider journal and the sun wheel shaft,
    wherein at least one of the planet spider journal and the sun wheel shaft are configured to be moved axially relative to the cover to a position in which the intermediate element abuts the cover;
    wherein the intermediate element is a grooved pin including an axial groove, the grooved pin configured to engage partially in an opening in at least one of the planet spider journal and the sun wheel shaft; and
    wherein the grooved pin has a hemisphere-shaped head arranged between the cover and at least one of the planet spider journal and the sun wheel shaft.

8. The planetary transmission according to claim 1, wherein a surface facing the cover on the intermediate element is partially hardened.

* * * * *